E. C. BALLMAN.
SYSTEM OF ELECTRICAL DISTRIBUTION.
APPLICATION FILED DEC. 18, 1916.

1,417,710.

Patented May 30, 1922.
2 SHEETS—SHEET 1.

Inventor:
EDWIN C. BALLMAN,
John N Bruninga
His Attorney.

UNITED STATES PATENT OFFICE.

EDWIN C. BALLMAN, OF ST. LOUIS, MISSOURI, ASSIGNOR TO VALLEY ELECTRIC COMPANY, OF WILMINGTON, DELAWARE, A CORPORATION OF DELAWARE.

SYSTEM OF ELECTRICAL DISTRIBUTION.

1,417,710.   Specification of Letters Patent.   Patented May 30, 1922.

Application filed December 18, 1916. Serial No. 137,686.

*To all whom it may concern:*

Be it known that I, EDWIN C. BALLMAN, a citizen of the United States, and residing at St. Louis, in the State of Missouri, have invented a certain new and useful Improvement in Systems of Electrical Distribution, of which the following is a specification.

This invention relates to a system of electrical distribution and is an improvement on the system shown and described in my co-pending application, Serial Number 50,408, filed September 13, 1915.

One of the objects of this invention is to provide a system of electrical distribution in which the current passing through current consuming devices, such as the head lights of an automobile which are connected in shunt, can be maintained constant, irrespective of the speed and frequency of the magneto or alternating current generator.

Another object is to provide a system of that type, in which the current traversing one of the current consuming devices will be maintained constant, irrespective of whether the other current consuming device or devices is or are connected or disconnected with or from the sources of current.

Further objects will appear from the detail description taken in connection with the accompanying drawings, in which, Figure 1 is a diagram illustrating an embodiment of this invention;

As described in the application referred to, in certain automobile lighting systems, the lamps receive the current from a low tension magneto. In such a system, however, the voltage, as well as the frequency, and, therefore, the voltage at the lamp terminals, and the current, as well as the candle power, will vary with the speed, thereby causing the lights to flicker, and moreover, burn out. In accordance with the invention as described in the application referred to, the current at the lamp terminals is maintained constant by connecting in the circuit a reactance whose impedance is the preponderating impedance of the circuit containing the lamp. This is accomplished by utilizing a reactance having a small resistance, compared with the reactance, and whose magnetic reluctance is maintained substantially constant with the varying frequency, by making a non-ferric part or air gap of the combination ferric and non-ferric magnetic circuit, the preponderating part or component of the total reluctance. It was shown that in such a system the current is independent of the speed and, therefore, remains substantially constant at varying speeds.

Figure 1:
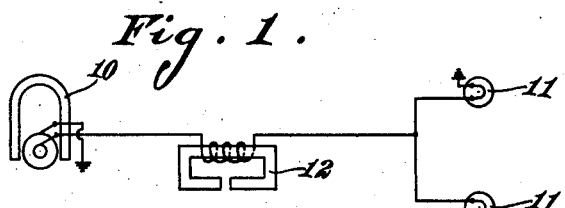

Referring to the accompanying drawing, and more particularly to Fig. 1, 10 designates a low tension magneto, 11 the lamps (low resistance) and 12 the regulator, as described in the application referred to. In this case, however, the lamps 11 which may be the head lights of an automobile, are connected in shunt with each other and in series with the generator and the regulator, one terminal of each lamp and one terminal of the magneto being shown grounded, as in the usual automobile practice. With such a construction, the current passing through the lamps will remain constant irrespective of the speed of the generator. Such a system is, however, open to the objection that if one lamp is burnt out or becomes accidentally disconnected, then since the system is such that the current traversing the entire circuit is maintained constant, double the voltage will be applied to the lamp which remains connected, so that this lamp will burn out.

Figure 2:
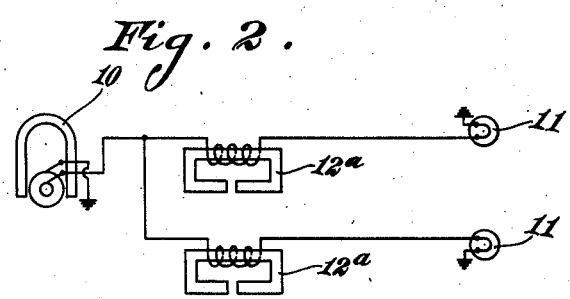
Figure 2 is a diagram illustrating another embodiment of this invention.

In accordance with the system as illustrated in Fig. 2, a separate regulator 12ª is connected in circuit with each lamp 11, so that given a generator with constant or good regulation, the current passing through the lamp will not be varied if one of the lamps is cut out of the circuit. As the regulation of a low tension magneto is, however, very poor, the voltage delivered by the magneto will rise considerable when one-half of the load is thrown off by the disconnection of a lamp, thereby causing the voltage at the lamp to increase, with the result that the lamp will operate above its rated capacity. This, while it may not burn out the lamp, will cause its life to be seriously affected.

Figure 3:
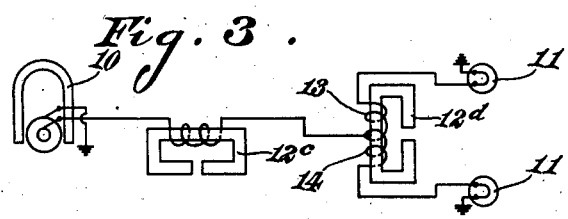
Figure 3 is a diagram illustrating another embodiment of this invention.
Figure 9:
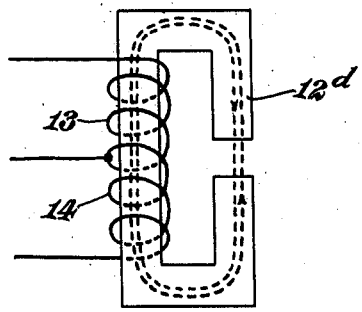
Figures 9 to 13 inclusive are diagrammatical views illustrating the operation of the system and regulator embodying this invention.

In the system illustrated in Figure 3, a regulator 12$^c$ is connected in series with the generator and both lamps, while a second regulator 12$^d$ has coils 13 and 14 connected in the shunt circuits of the lamps. Upon reference to Fig. 3, it will be noted that the coils 13 and 14 being wound in the same direction, will set up opposing magnetic fields in the core, as shown in Fig. 9, and if the turns and resistances of the windings are equal, the reactance of each winding will be zero. The reactance of the regulator 12$^c$ can, therefore, be proportioned, as in Fig. 1, and as in the application referred to, so as to maintain the current flow through the lamps constant, irrespective of the speed of the generator. When, however, one of the lamps, such as the lower lamp 11, Fig. 3, is disconnected, then since no current will flow in the winding 14, the winding 13 will have reactance. The reactance of the winding 13 or 14 may, therefore, be so proportioned that this reactance, added to the reactance of the regulator 12$^c$, will be sufficient to cause normal current to flow through the connected lamp when the other lamp is disconnected. In this embodiment, therefore, the current flowing through a lamp will remain constant whether one or more lamps are connected in circuit with the regulator and the source of current.

Figure 4:
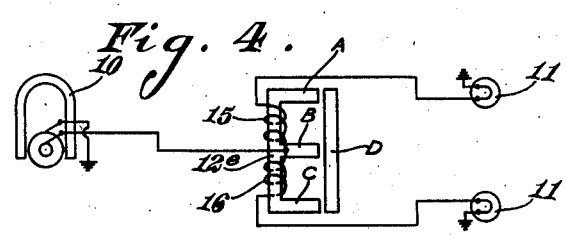
Figure 4 is a diagram illustrating still another embodiment of this invention.
Figure 10:
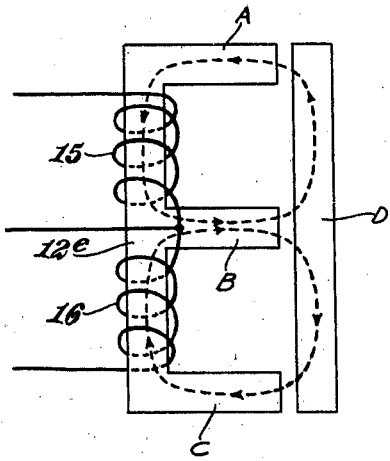
Figure 11:
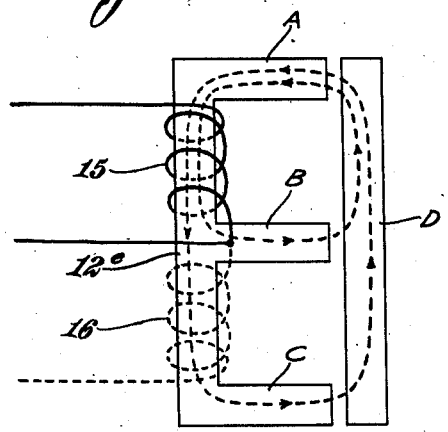

It will be understood, of course, that the regulators 12$^a$ of a set, shown in Fig. 2, may be placed in a single casing so as to form in effect, a single reactance device or regulator, and the same is true of the regulators 12$^c$ and 12$^d$, Fig. 3. The reactance or regulators 12$^c$ and 12$^d$, may, however, be combined or wound on a single core by proper construction of the core and the proper arrangement and connection of the windings. This is shown in Fig. 4, where the regulator 12$^e$ has legs A, B and C, arranged to form combination ferric and nonferric magnetic circuits with a core element D. The core is provided with reactance windings 15 and 16, the common terminal of which is connected with the generator terminal, and the other terminals of which are connected in circuit with the lamps. The windings 15 and 16 are wound and connected as in Fig. 3, so as to set up magnetic fields in shunt, as shown in Fig. 10, the arrows showing the instantaneous directions of the fluxes in the magnetic circuits. Upon reference to Fig. 11, which shows only one winding 15 connected, it will be noted that the winding sets up shunt magnetic fields comprising a main magnetic field, including the legs A and B, and a shunt magnetic field, including the legs A and C. It will be seen also that if only the winding 16 is connected, then this winding will set up a main magnetic field, including the legs C and B, and a shunt magnetic field, including the legs C and A. The shunt magnetic fields, set up by the windings 15 and 16, are, however, in opposition, so that if the ampere-turns of the windings are equal, the shunt fields will neutralize one another whereby the resultant magnetic fields will be as indicated in Fig. 10. The windings 15 and 16 will, therefore, act as separate reactances, and these reactances can be so proportioned that when both windings are connected, the current flowing through each lamp will have a predetermined value and will remain constant irrespective of the speed of the generator. When, however, one of the windings, such as 16, is disconnected by the disconnection or burning out of the lower lamp, Fig. 4, then the winding 15 will set up main and shunt fields, as shown in Fig. 11. By a proper proportioning of the core, that is, of the cross-sections and lengths of the flux paths, the reactance can be made to increase when one of the windings 15 or 16 is disconnected, and this increase can, as in Fig. 3, be made sufficient to maintain the current traversing the connected lamp of the same value and constant irrespective of the speed.

Figure 7:
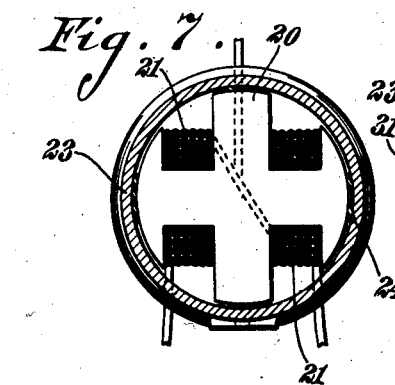
Figure 7 is a section on the line 7—7, Fig. 6.
Figure 5:
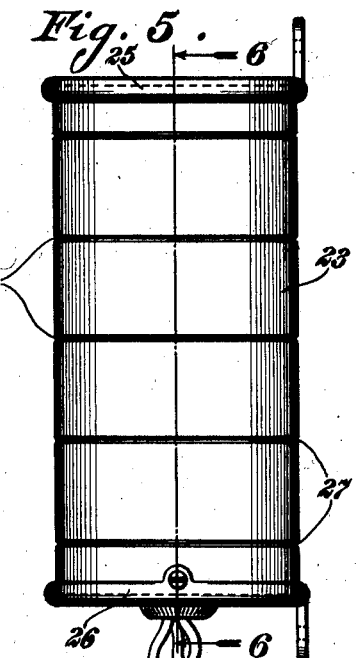
Figure 5 is a side elevation showing a regulator embodying this invention.
Figure 6:
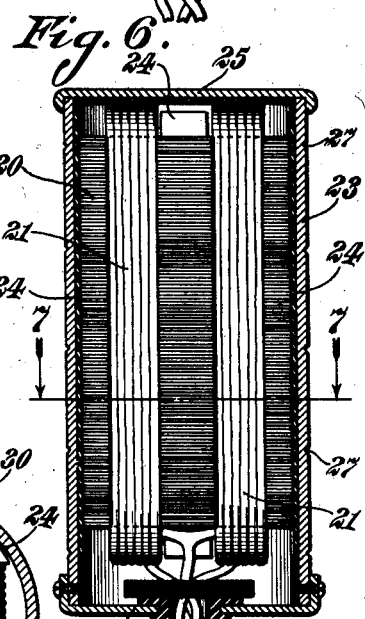
Figure 6 is a section on the line 6—6, Fig. 5.
Figure 12:
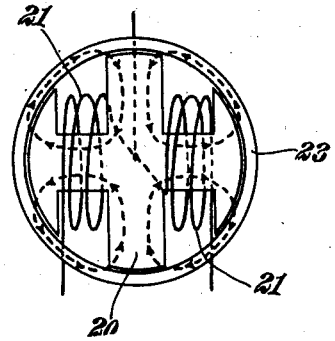

In Figures 5, 6 and 7, is shown a practical embodiment of a regulator embodying this invention. This regulator comprises a laminated core 20, having windings 21, and surrounded by a shell 23 of soft iron, which is spaced from the core by means of insulation 24. The core may have caps 25 and 26 closing the ends thereof, the cap 26 being provided with an outlet for the terminals, and the shell may be provided with annular grooves 27 to reduce the eddy currents, as in the application referred to. By a proper proportioning of the core and the windings, and by proper positioning of the core with respect to the shell, the air gap reluctance can be made preponderating, as in the application referred to, so as to keep the currents traversing the lamps, constant irrespective of the speed of the generator, and irrespective of whether one or more lamps are connected in circuit. After the core is properly positioned, it can be fixed with respect to the shell by means of pouring cement into the spaces. The magnetic circuits of this type of core are shown in Fig. 12.

Figure 8:
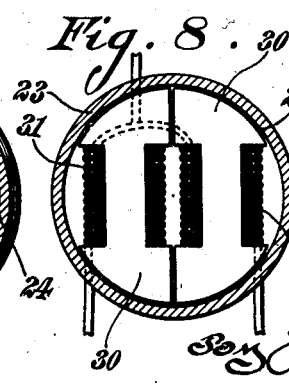
Figure 8 is a section similar to Fig. 7, but showing still another embodiment of this invention.
Figure 13:
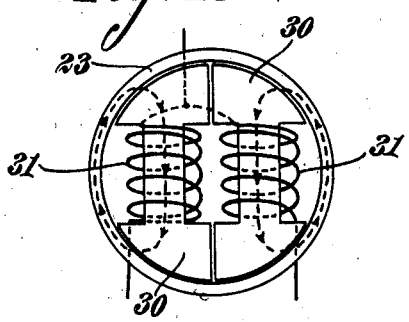

Figure 8 shows another embodiment of this invention, in which the core is made up of separate laminated structures 30, each of which is provided with a winding 31. In this case there are formed air gaps between the core section, as well as between the core and the shell, so that the air gaps between the shell and each core, as well as between the core section, are adjustable. In this case, the reactance of each winding may be separately adjusted and the ratio of reactance of one winding to the other winding when both are connected in circuit may be varied. The magnetic circuits of this embodiment are shown in Fig. 13.

It will thus be seen that the invention accomplishes its objects. A system is provided in which the current consumed by a lamp is maintained constant, irrespective of the speed of the generator, and irrespective of whether one or more lamps are connected in circuit, this being accomplished by maintaining the coefficient of reactance constant when a predetermined current is to traverse the same, and varying the coefficient of reactance to accommodate a newly established value of the current.

It is obvious that various changes may be made in the details of construction, within the scope of the appended claims, without departing from the spirit of this invention. It is, therefore, to be understood that this invention is not to be limited to the specific construction shown and described.

Having thus described the invention, what is claimed is:

1. In a system of electrical distribution, an alternating current generator, current consuming devices connected in shunt relation and in series with said generator, and a reactance device comprising a plurality of coils, and a magnetic circuit adapted to carry the flux of each of said coils in a separate, nearly closed circuit when all coils are active, and when one or more of said coils are inactive to render the flux paths of said inactive coils available to carry the flux of said active coils.

2. In a system of electrical distribution, an alternating current generator, current consuming devices connected in shunt relation and in series with said generator, and a reactance device comprising a plurality of coils, and a magnetic circuit adapted to carry the flux of each of said coils in a separate, nearly closed circuit when all coils are active, and when one or more of said coils are inactive to reduce the reluctance of the magnetic circuit of said active coils.

3. In a system of electrical distribution, an alternating current generator, current consuming devices connected in shunt relation and in series with said generator, and a reactance device comprising a plurality of coils, and an independent and nearly closed magnetic circuit for each coil, the whole being constructed and arranged to increase, when one or more of said coils are inactive, the reactance of said active coils.

4. In a system of electrical distribution, an alternating current generator, current consuming devices connected in shunt relation and in series with said generator, and a reactance device comprising a plurality of coils, and an independent and nearly closed magnetic circuit for each coil, said circuits being constructed and arranged to cooperate to automatically increase, when one or more of said coils are inactive, the reactance of said active coils.

5. In a system of electrical distribution, an alternating current generator, current consuming devices connected in shunt relation and in series with said generator, and a reactance device comprising a plurality of coils, a core for said coils adapted to form part of a plurality of magnetic circuits, and a member adapted to form a return path for a plurality of said magnetic circuits.

6. In a system of electrical distribution, an alternating current generator, current consuming devices connected in shunt relation and in series with said generator, and a reactance device comprising a plurality of coils, a core for said coils adapted to form part of a plurality of magnetic circuits and a unitary member adapted to form a return path for all of said magnetic circuits.

7. An alternating current regulator comprising a core constructed to form a plurality of nearly closed magnetic circuits, and reactance windings on said core, adapted to cause each winding to set up magnetic fields in said circuits, whereby the reactance of one winding will vary when the other is connected with or disconnected from a source of current.

8. An alternating current regulator comprising a core constructed to form a plurality of nearly closed magnetic circuits, and reactance windings on said core, adapted to cause each winding to set up magnetic fields in said circuits, the fields in the same circuit being in opposition, whereby the reactance of one winding will vary when the other is connected with or disconnected from a source of current.

9. An alternating current regulator comprising a core constructed to form a plurality of nearly closed shunt magnetic circuits, reactance windings on said core, each winding setting up a main field in one circuit and a shunt field in another circuit superimposed on the main field set up by the other winding.

10. An alternating current regulator comprising a core constructed to form a plurality of nearly closed shunt magnetic circuits, reactance windings connected in shunt relation on said core, each winding setting up a main field in one circuit and a shunt field in another circuit in opposition to the main field set up by the other winding.

In testimony whereof I affix my signature this 23d day of Sept., 1916.

EDWIN C. BALLMAN.